May 25, 1954     S. D. BRADLEY     2,679,075
WEATHER STRIP
Filed Dec. 20, 1951
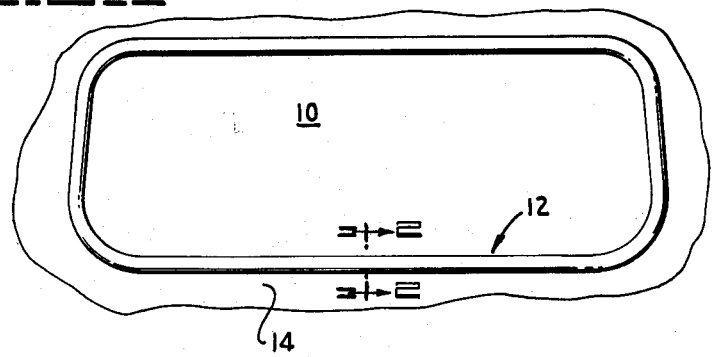
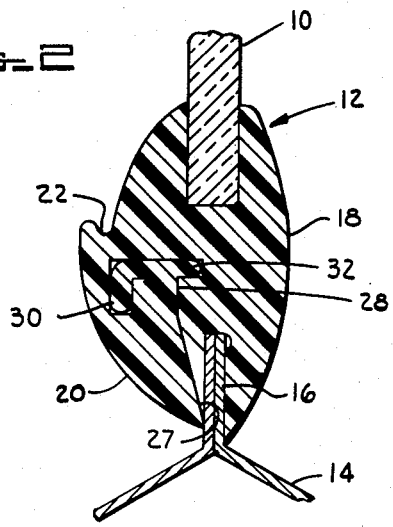
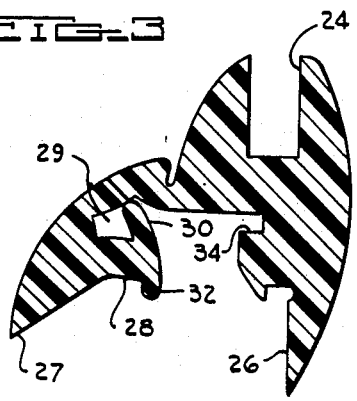
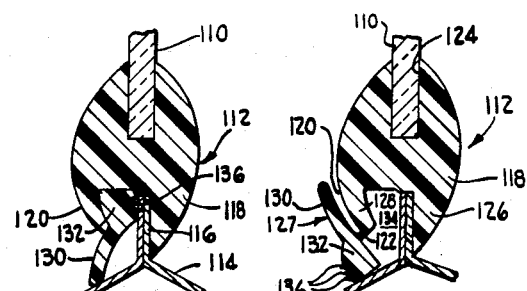
INVENTOR.
STEPHEN D. BRADLEY
BY
ATTORNEY Patented May 25, 1954

2,679,075

UNITED STATES PATENT OFFICE 2,679,075

WEATHER STRIP

Stephen D. Bradley, Detroit, Mich., assignor to Detroit Macoid Corporation, Detroit, Mich., a corporation of Michigan Application December 20, 1951, Serial No. 262,529

4 Claims. (Cl. 20—56.4)

The present invention relates to an improved weather strip which is particularly but not exclusively adapted to provide a cushioning support and weather seal between an automobile window or windshield glass and the body of the automobile.

When a weatherstrip is in position between the window panel and the frame portion of the body surrounding the window opening of an automobile, it has been found desirable to provide some type of locking means which will exert pressure within the weatherstrip and hold the window panel securely in position without danger of the weatherstrip working loose. One manner of accomplishing this has been to form a groove in the side of the weatherstrip body and expand the groove for insertion of a separate rigid member within the expanded groove after the weatherstrip is in the assembled position. Such a procedure generally requires special expansion and locating tools. Further, since the separate inserted rigid member and the weatherstrip usually are of different materials, it has been found that the inserts work loose within a relatively short time and the lock is no longer efficient.

A principal object of the present invention is to provide an improved weatherstrip wherein simple and efficient locking means is provided to efficiently lock the weatherstrip in the assembled position under pressure between aligned members to be connected.

Another object of the present invention is to provide such a weatherstrip wherein the locking means is provided as an integral part thereof.

Other objects of this invention will appear in the following description and appended claims, reference being had to the accompanying drawings forming a part of this specification wherein like reference characters designate corresponding parts in the several views.

In the drawings:

Figure 1 is a fragmentary elevation showing the exterior side of an automobile windshield mounted in an automobile body by the weatherstrip of the present invention;

Fig. 2 is an enlarged fragmentary section taken along line 2—2 in the direction of the arrows, Fig. 1;

Fig. 3 is a sectional view of the weatherstrip shown in Fig. 2 in the open or unassembled position; and Figs. 4 and 5 are views similar to Figs. 2 and 3 respectively but showing a modification of the present invention.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A particular embodiment of the present invention is shown in the drawings wherein Fig. 1 shows an automobile window panel 10 joined by the weatherstrip, indicated generally by the numeral 12, at a weatherproof seal to the sheet metal edges of the windshield opening provided in the automobile body 14.

Referring to Fig. 2 of the drawings, a metal flange 16 is provided by the pinch weld formed on the body 14, which flange 16 surrounds the windshield opening in the vehicle. The weatherstrip 12 resiliently cushions the window panel 10 and seals the space between the flange 16 and the edges of the window panel 10.

The weatherstrip of the present invention preferably comprises an elastic deformable material, such as rubber or rubber-like plastic material, and may be suitably formed by conventional extrusion methods. The body of the weatherstrip 12 comprises an outer trim molding 18 and an inner trim molding 20 connected by a web 22. The inner portion of the body is provided with the groove 24 which is adapted to receive the edge of the window panel 10. The outer side of the body is provided with a gripping portion comprising the flattened leg 26 and the normally displaced leg 27 which are adapted to grip the body flange 16 in the assembled position.

A locking member is provided integral with the weatherstrip. This locking member comprises a T-shaped head 28 extending inwardly from the inner trim molding 20 and having an opening 29 adjacent thereto. The cross bar of the T-shaped head 28 is unbalanced and provides a long peg 30 and a short peg 32. A recess 34 is formed in the weatherstrip body and is adapted to receive the short peg 32 of the head 28 in the locked position.

In assembling, the weatherstrip 12 disclosed in Fig. 3 is placed so that the groove 24 seats the edge of the window panel 10 as in Fig. 2. The flat leg 26 adjacent the outer trim molding 18 is then placed against the flange 16 of the automobile body 14. The inner trim molding 20 is next moved inwardly toward the glass panel 10. The long peg 30 is folded back into the opening 29 and the short peg 32 is snapped into the groove 34. The leg 27 of the gripping portion is thus held against the inner portion of the body flange 16.

With the locking member in the operative position (Fig. 2) the deformed long peg 30 of the head 28 tends to force the inner trim molding 20 away from the body flange 16. This force is counterbalanced by the short peg 32 which seats in the groove 34 and prevents the inner trim molding 20 from being displaced from the operative position.

In the modification shown in Figs. 4 and 5 of the drawings, the design and operation of the locking member has been changed to increase the effective area of pressure applications inside of the strip. As here shown, the strip 112 is connected between a glass panel 110 and the flange 116 formed on the body 114 surrounding the opening in which the window panel 110 is to be mounted.

The body of the weatherstrip 112 comprises an outer trim molding 118 and an inner trim molding 120 connected by a web 122. The inner portion of the body is provided with the groove 124 which is adapted to receive the edge of the window panel 110. The outer side of the body is provided with a gripping portion comprising the flattened leg 126 and the normally displaced leg 127 which are adapted to grip the body flange 116 in the assembled position.

A locking member is provided integral with the weatherstrip. This locking member comprises the substantially T-shaped head 128 extending outwardly from the inner trim molding 120. The cross bar of the T-shaped head 128 is unbalanced and provides a long peg 130 and a short heavy peg 132 having the fingers 136 formed thereon. A recess 134 is formed in the weatherstrip body and is adapted to receive the short peg 132 of the head 128 in the locked position. The fingers 136 are distorted when they engage the flange 116 and create a pressure which holds the peg 132 in position within the recess 134. The long peg 130 of the head 128 is disposed against the body 114 of the vehicle to create an additional pressure which holds the short peg 132 of the head 128 in position within the recess 134.

Assembling of the weatherstrip 112 in position is accomplished in much the same manner as explained in connection with the first embodiment of the invention and is believed obvious without necessitating further explanation.

Either form of my construction thus provides a simple and efficient locking means which is integral with the weatherstrip. Since the entire weatherstrip is formed of the same material there is no danger of one part expanding or contracting at a different rate than another to render the weatherstrip inefficient. The lock provides a pressurized engagement between the weatherstrip and the window panel and the weatherstrip and the automobile body flange to increase the efficiency of the seal and provide a weathertight contact at these points.

Having thus described my invention, I claim:

1. A weatherstrip adapted to engage adjacent edge portions of two parts to be joined, comprising a body of resilient material having an inwardly extending groove therein adapted to receive the edge portion of the first of the two parts, a gripping portion formed on the outer side of said body and adapted to grip the second of said parts, said gripping portion comprising a pair of legs one of which is displaced in the normal position, a substantially T-shaped locking head formed on the normally displaced leg, the cross bar on the T-shaped locking head being unbalanced to provide a short heavy peg having protruding fingers thereon and a long peg, and a recess formed in the weatherstrip body to receive the short peg of the locking head, the fingers on said short peg being deformed in assembly against the first part to be joined and the long peg extending against the first part to be joined to exert a pressure and maintain the locking head in the locked position.

2. A weatherstrip for joining two parts comprising, a body of resilient material having a portion thereof formed to receive an edge of one of the parts, a first leg, integrally formed with said body for seating an edge of the second part, a second leg hingedly connected to said body by a resilient neck, the resilience of said neck tending to force said second leg way from said first leg, said first and second legs together forming a recess therebetween, a locking head integrally formed with said second leg, a first projection on said locking head, and a second projection compressively retained in assembly between said locking head and the surface which defines said recess for urging said first projection into locking position in the recess.

3. A weatherstrip for joining two parts comprising; a body of resilient material having a portion thereof formed to receive an edge of one of the parts, a first leg integrally formed with said body for seating an edge of the second part, a second leg hingedly connected to said body by a resilient neck, the resilience of said neck tending to force said second leg away from said first leg, said first and second legs together forming a recess therebetween, a locking head integrally formed with said second leg, a first projection on said locking head, and a second projection folded in assembly to be flat in a compressed position between said locking head and the surface which defines said recess for urging said first projection into locking position in the recess.

4. A weatherstrip adapted to engage adjacent edge portions of two parts to be joined, comprising a body of resilient material having an inwardly extending groove therein adapted to receive the edge portion of one of the two parts, an outwardly extending gripping member formed on the outer side of said body and adapted to seat the other of the two parts, said gripping member having one leg normally displaced from the gripping position, a T-shaped locking head formed on the normally displaced leg and having an opening adjacent thereto, and a recess formed in the weatherstrip body to receive one portion of the cross bar on the T-shaped locking head, the other portion of the cross bar being deformed in assembly in the opening adjacent the locking head in the locked position; said one portion being longer than said other portion.

References Cited in the file of this patent

UNITED STATES PATENTS

| Number | Name | Date |
| --- | --- | --- |
| 2,288,329 | Smith | June 30, 1942 |
| 2,505,893 | Haas | May 2, 1950 |
| 2,623,250 | Chilton | Dec. 30, 1952 |